Jan. 28, 1969 P. W. KOK 3,424,901
STEREOSCOPIC X-RAY APPARATUS
Filed Feb. 1, 1965 Sheet 3 of 3

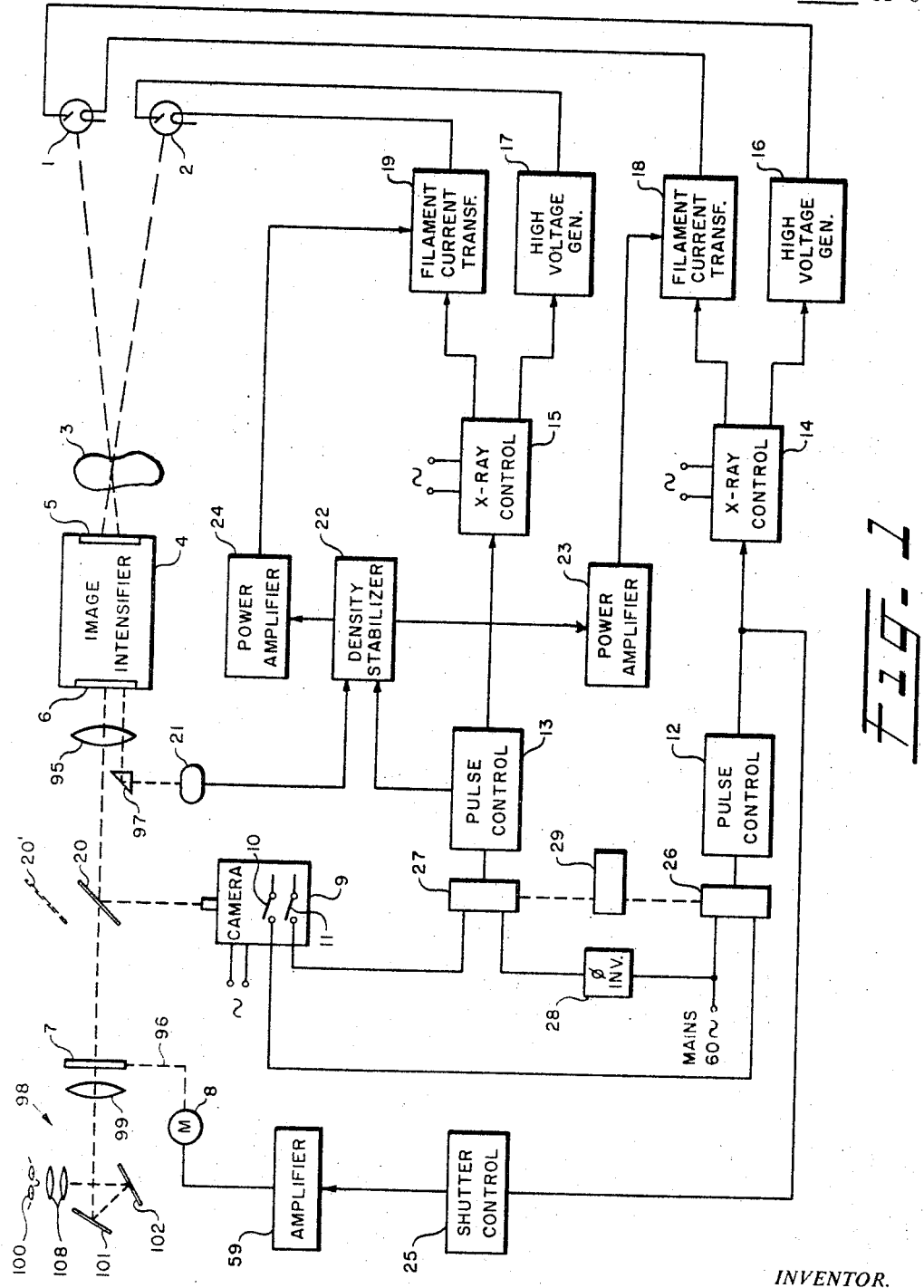

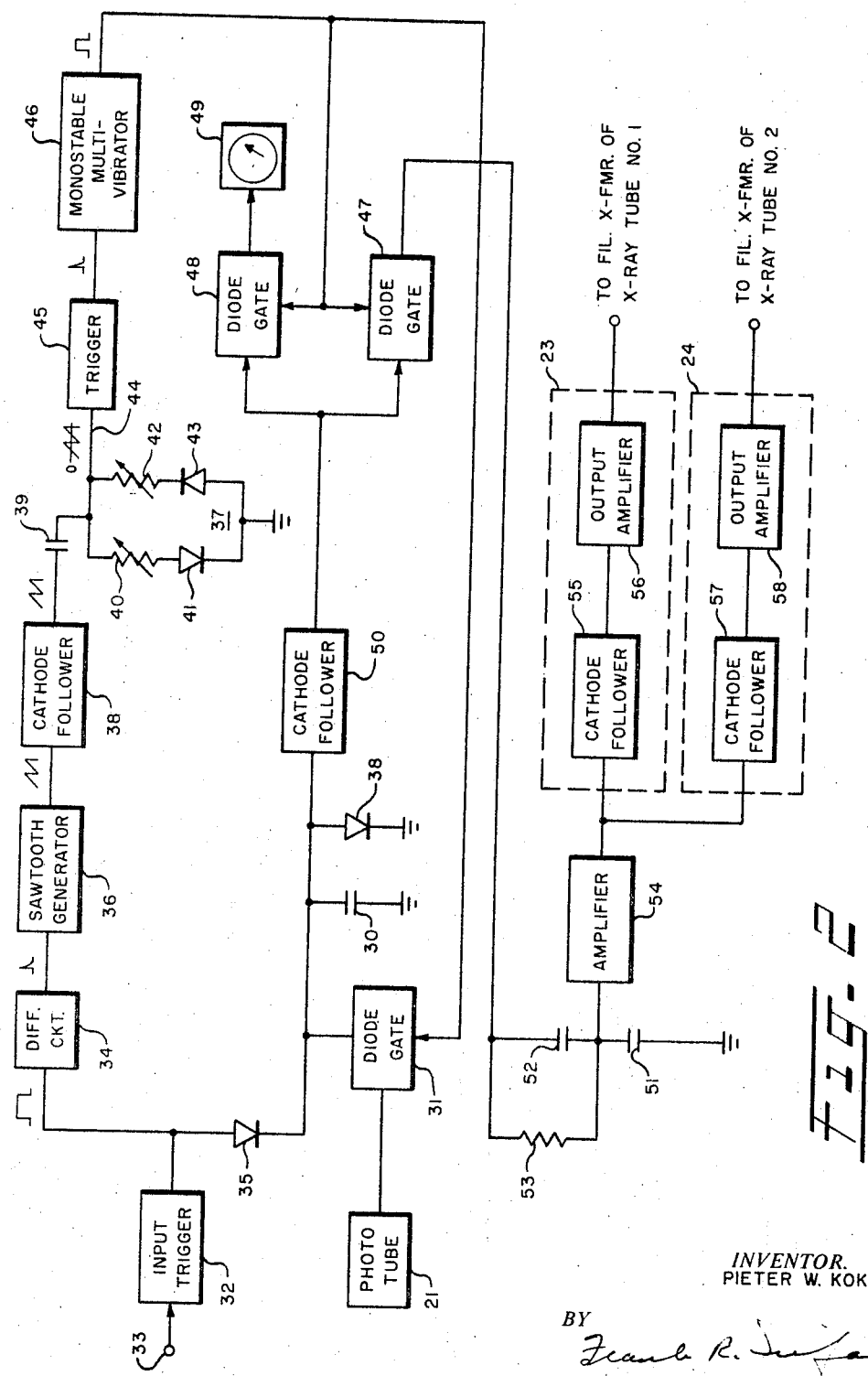

INVENTOR.
PIETER W. KOK
BY
AGENT

United States Patent Office 3,424,901
Patented Jan. 28, 1969

3,424,901
STEREOSCOPIC X-RAY APPARATUS
Pieter W. Kok, New Milford, N.J., assignor to North American Philips Company, Inc., New York, N.Y., a corporation of Delaware
Filed Feb. 1, 1965, Ser. No. 429,377
U.S. Cl. 250—60
Int. Cl. G01n 23/04; H01j 37/22
1 Claim

ABSTRACT OF THE DISCLOSURE

Stereoscopic X-ray apparatus provides means for viewing a fluoroscopic image of an object and for simultaneously recording the object on film by means of a movie camera. The camera shutter, the energization of a pair of X-ray tubes, and the fluoroscopic shutter are driven together in synchronism. The apparatus further includes a density stabilizer circuit responsive to the light image produced by one of the X-ray tubes for providing a control signal to regulate the filament current of both X-ray tubes.

---

This invention relates to stereoscopic X-ray apparatus and more particularly to an improved automatic pulse-type stereoscopic X-ray system for use in X-ray fluoroscopy and cinefluorography.

The conventional two-dimensional type of X-ray apparatus in widespread use today does not always provide adequate information for the radiologist despite the highly developed radiographic techniques in use at the present time. In certain types of X-ray diagnostic work, for example, in cardiovascular studies, it is difficult to interpret the shadows cast upon a fluoroscopic screen or the like because these shadows lack perspective or depth. X-ray apparatus capable of providing a three dimensional view of the heart would be of tremendous value to the cardiac surgeon.

Although biplane cineradiography has been used to obtain this information, in order to obtain a view in two planes, it is necessary either to repeat the procedure thereby giving a double dose of contrast substance and X-rays to the patient, both of which are toxic, or purchase additional equipment duplicating existing apparatus.

Various other X-ray stereoscopic devices have been proposed in the past, but as yet none of these systems have received any widespread acceptance because of various limitations inherent therein.

An object of this invention is to provide a new and improved stereoscopic X-ray system by which improved three dimensional fluoroscopy and cinefluorography may be achieved.

Another object is to provide a pulse-type stereo X-ray system in which alternate left and right eye pictures are taken in rapid succession and automatically separated for fluoroscopic viewing or cinefluorographic recording.

Still another object is to provide a pulse-type stereo X-ray system in which the stereo shutter, the camera shutter and the X-ray pulses are automatically maintained in synchronism.

A further object is to provide a stereo X-ray system which provides X-ray stereo motion pictures of better detail and greater contrast than is presently available.

Another object is to provide a pulse-type stereo X-ray system in which the X-rays are only generated during the time interval that the camera shutter is opened thereby minimizing the X-ray dosage of the object under investigation.

In a stereo system of the type contemplated herein, a further problem arises in that the image intensifier used to display the images is irradiated by two different X-ray tubes so that additional apparatus is required in order to control the X-ray tubes to the correct density level. A further feature of the invention is the provision of apparatus for automatically regulating the filament current of both X-ray tubes.

It is therefore another object to provide a stereo X-ray system having means for insuring equality in intensity and character of the X-rays produced by each of the X-ray tubes, or for controlling these intensities with respect to each other in any desired manner.

A further object is to provide a stereo X-ray system having means for automatically regulating the filament current of each of the two X-ray tubes in accordance with the light intensity level produced in the image intensifier by a predetermined one of the two X-ray tubes.

According to the invention, the above objects are achieved by means of a pulse-type stereo X-ray system comprising a pair of alternately pulsed X-ray tubes and an image intensifier tube for producing alternate visual images of the object under investigation corresponding to the left and right eye images. A stereo shutter for separating the alternate left and right eye images produced by the image intensifier is interposed between the output screen and the viewer. Means are provided for synchronizing the operation of the camera shutter, stereo shutter and the pulsing of the X-ray tubes. Successive images produced by the two X-ray tubes on the image intensifier fluoroescent screen are viewed in proper relation first by one eye of the observer and then by the other in synchronism with the X-ray tubes to produce the effect of a three dimensional image. In cinefluorography, successive frames of the camera alternately record left and right eye images which can be subsequently viewed by means of any number of three dimensional movie projection techniques. By pulsing the X-ray tubes synchronously with the shutter movement, the X-rays are only generated when the camera shutter is open. Means are further provided for automatically controlling the two X-ray tubes to the correct density level by automatically varying the tube filament currents in response to variations in the light image intensity level.

A more complete understanding of the invention and its objects will follow from the detailed description thereof and the accompanying drawing wherein:

FIG. 1 is a diagrammatic representation of one form of apparatus illustrating the invention;

FIG. 2 illustrates the density stabilizer unit of FIG. 1 in greater detail;

Figure 4:
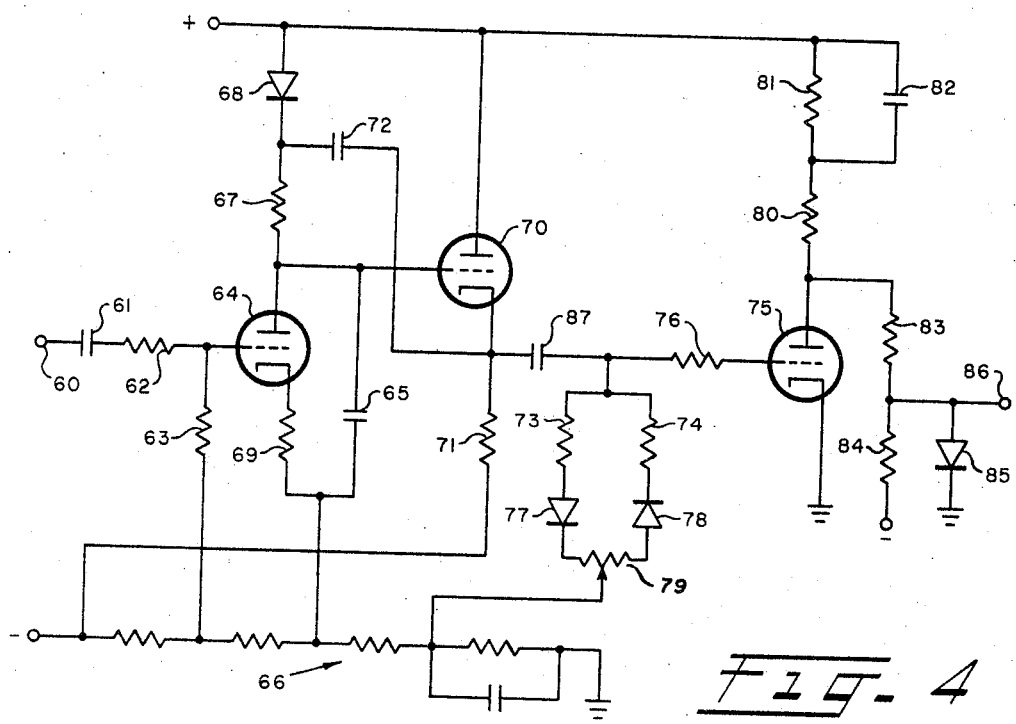
FIG. 4 is a schematic diagram of the stereo shutter control circuit of FIG. 1.

Referring to FIG. 1 of the drawing, there is shown a pair of X-ray tubes 1 and 2 for alternately producing and directing individual X-ray beams towards an object 3 to be investigated. An X-ray image is projected onto the input screen 5 of an image intensifier tube 4 of known kind, for example, as shown in U.S. Patents 2,681,420, or 2,692,341. The X-ray image produced by the X-ray beam is converted into an optical image on the input screen 5. The optical image is in turn converted into an electron image and focused onto the output fluorescent screen 6. A reduced and intensified reproduction of the X-ray image is produced in fluorescent light on the screen 6 of the image intensifier.

The light image appearing on fluorescent screen 6 is projected by an optical lens system 95 towards a mirror 20. The mirror reflects most of the light energy received towards a camera 9. The remainder of the light energy is passed on towards a rotatable stereo shutter 7 which is driven by a synchronous motor 8 through suitable drive means illustrated generally by the broken line 96. Synchronous motor 8 is energized by means of amplifier 59.

Figure 5:
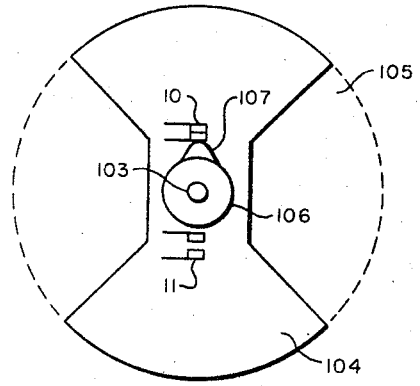
FIG. 5 shows one form of camera shutter mechanism and contacts suitable for use in the invention.

The camera 9 includes a pair of contacts 10 and 11 which are driven by the shutter drive mechanism. Contacts 10 and 11 are alternately closed in synchronism with the opening of the camera shutter. Each closure of contact 10 causes pulse control unit 12 to produce a signal pulse and each closure of contact 11 causes pulse control unit 13 to produce a signal pulse. The particular arrangement of shutter, shutter drive mechanism and contacts are not essential to the invention herein so long as the contacts are alternately closed in synchronism with the opening of the camera shutter. One possible arrangement is shown in FIG. 5. Mounted on the drive shaft 103 is a shutter in the form of a disc 104 having a pair of symmetrically disposed apertures 105 therein for exposing the film, not shown. Also mounted on drive shaft 103 is a disc 106 which has a protruding portion 107 which alternately closes contacts 10 and 11 as the shutter drive shaft rotates.

The alternate signal pulses produced by pulse control units 12 and 13 are supplied to X-ray supply and control units 14 and 15, respectively. X-ray control units 14 and 15 may be of conventional design and are supplied with 60 cycle power from the available power line. The power line may be connected through individual autotransformers in control units 14 and 15 to the primary of the X-ray or high voltage transformers located in the high-voltage generator units 16 and 17, respectively. The primary generator voltage may be varied by suitable means in control units 14 and 15, for example, by means of taps on the autotransformer winding, in order to adjust the output voltage of the secondary and hence the output of the X-ray tubes 1 and 2. Each of the high voltage generators 16 and 17 may also include a pair of normally cut-off high voltage switching tubes connected in series with their respective X-ray tubes, 1 and 2, for example, as shown in U.S. Patent 2,659,016. Control units 14 and 15 alternately pulse the control grids of the switching tubes in high-voltage generators 16 and 17 in response to the signal pulses received from pulse control units 12 and 13. High-voltage generators 16 and 17 thereby alternately supply high voltage pulses to the X-ray tubes 1 and 2, respectively, in synchronism with the closure of camera contacts 10 and 11, respectively, i.e. at the instants of time when the camera shutter is open.

X-ray tubes 1 and 2 are supplied with filament current by means of filament transformers 18 and 19, respectively. X-ray control units 14 and 15 include means for adjusting the filament current level supplied to tubes 1 and 2, for example, by means of a potentiometer inserted in series with the input line voltage and the primary winding of the filament transformer. For automatic regulation of the filament current, the aforementioned series circuit also includes the secondary winding of the power amplifier transformer. The primary winding of said transformer is connected in the anode circuit of power amplifier units 23 and 24 for automatically regulating the filament currents of X-ray tubes 1 and 2, respectively, as will be described more fully with reference to the density stabilizer of FIG. 2.

A prism arrangement 97 deflects a portion of the light from the visible image produced on screen 6 onto a photoelectric cell, for example, a photomultiplier tube 21. It is of course obvious that the image intensifier 4, lens system 95, prism 97 and photoelectric cell 21 may all be enclosed in a light proof container to minimize the amount of extraneous light energy striking photocell 21. Furthermore, the light proof container could also house mirror 20, stereo shutter 7, and the stereo viewer indicated generally as 98. Of course, the light proof container must have an aperture for coupling the light image to camera 9. Photoelectric cell 21 supplies an electric signal to density stabilizer unit 22 which is proportional to the intensity of the visual image produced on output screen 6 of the image intensifier tube. The density stabilizer unit includes storage means for integrating the electric signal representing the light intensity received during the time interval that the camera shutter is open and X-ray tube 2 is energized. By this means, the light output produced by a single X-ray tube, in this case tube 2, is effectively integrated and used to regulate the filament current of both X-ray tubes. Pulse control unit 13 supplies a control signal to one input of density stabilizer 22 at each closure of camera contact 11, thereby effectively limiting the light control signal stored in density stabilizer unit 22 to a time interval during which the light image produced by X-ray tube 2 is transmitted to the camera film. The density stabilizer unit is shown in greater detail in FIG. 2, and will be described more fully in conjunction with the description thereof. Suffice it to say at this time that the density stabilizer supplies a control signal to the output power amplifiers 23 and 24 during each shutter cycle. This control signal is proportional to the integrated light intensity produced by X-ray tube 2. The output of power amplifiers 23 and 24 are connected to filament transformers 18 and 19, respectively, and operate to automatically adjust the filament currents of X-ray tubes 1 and 2 in response to the light signals produced in photoelectric cell 21.

The signal pulses produced in pulse control unit 12 are also supplied to shutter control unit 25 and serve to synchronize the movement of stereo shutter 7, by means of amplifier 59 and synchronous motor 8, with the camera shutter and the pulsing of the X-ray tubes. The portion of the light image passing through mirror 20 also passes through stereo shutter 7 which is synchronized with the energization of X-ray tubes 1 and 2. This light image is projected by means of a suitable optical system alternately to the left and right eyes of an observer, shown at 100. One suitable optical system comprises a lens system 99, mirrors 101 and 102, and a magnifier lens system 108. Since the stereo shutter 7 alternately exposes the left and right eyes of an observer to the light image in synchronism with the pulses of X-ray energy produced, a three dimensional impression is produced upon the observer. By means of the stereo viewer, the radiologist can visually monitor the operation of the system during cinefluorography.

For stereo fluoroscopy, the mirror 20 may be moved out of the light path to the position 20' shown in broken lines so that an observer may view the image intensifier screen directly through the stereo shutter. In this case, the synchronizing pulses are derived from the 60 cycle line frequency which is applied directly to selector unit 26 and indirectly to selector unit 27 via phase inverter 28. The phase inverter 28 can consist of a mere interchange of the supply leads to pulse control units 12 and 13. Selector control unit 29 provides an external control for switching the operation between the cinefluorography and fluoroscopy modes of operation. By means of phase inverter 28, pulse control units 12 and 13 are alternately pulsed in synchronism with the 60 cycle line frequency. The stereo shutter 7 is also driven synchronously with the line frequency via shutter control 25, amplifier 59 and synchronous motor 8.

Figure 3:
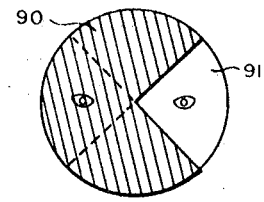
FIG. 3 shows one form of stereo shutter suitable for use in the invention.

The stereo shutter 7 is shown in FIG. 3. The stereo shutter comprises an opaque disk 90 having a pie-shaped wedge 91 cut out therefrom. As the disk revolves, the left and right eyes of the viewer are alternately exposed to the fluoroscopic light image emanating from the output screen 6 of the image intensifier. Since the shutter drive motor 8 is synchronized with the X-ray pulses of the left and right X-ray tubes, a three dimensional impression is produced upon the observer, as described above.

FIG. 2 illustrates the details of the density stabilizer circuit shown as block 22 in FIG. 1. As mentioned above, the density stabilizer circuit stores and integrates an electric signal proportional to the light image produced on the output screen of the image intensifier tube for a time interval commencing at the instant the camera shutter is full open and ending at the instant the camera shutter is half closed. Only the light image energy produced by one X-ray tube, for example, X-ray tube 2, is stored and integrated, and the filament currents of both X-ray tubes are regulated by means of this one signal.

Photo-multiplier tube 21 supplies a negative electric charge proportional to the light image intensity to integrating capacitor 30 by means of a normally open diode gate 31. The input trigger circuit 32 comprises a conventional one-shot monostable multivibrator which is triggered into its unstable state by means of a control quantity supplied from camera contact 11 to input terminal 33. Several forms of monostable multivibrator suitable for use as the input trigger circuit are described at pages 166–171 of "Waveforms" by Chance et al., volume 19 of the Radiation Laboratory Series (copyright 1949). Input trigger 32 is part of pulse control unit 13 and supplies a positive square wave of a given duration to the input of differentiating circuit 34 and to integrating capacitor 30 via diode 35 at each closure of camera contact 11, i.e. at the instant the camera shutter is full open and X-ray tube 2 is energized. The stored negative charge on capacitor 30 previously supplied by photomultiplier 21 is thus neutralized at the beginning of each new shutter cycle for X-ray tube 2. Diode 38 is connected across integrating capacitor 30 and poled so as to prevent the accumulation of a reverse charge on capacitor 30 because of the positive neutralizing pulse applied thereto from input trigger 32. Differentiating circuit 34 comprises a conventional series resistance-capacitance circuit having a short RC time constant relative to the period of the square wave pulse applied thereto.

The sharp pulse produced at the output of differentiating circuit 34 is applied to a synchronized sawtooth generator 36 of the general type disclosed at page 602 of "Radio Engineering" by Frederick E. Terman (third edition, 1947). The sawtooth generator includes a normally cut-off triode having a sweep capacitor in its plate circuit. The sweep capacitor charges linearly towards the positive supply voltage until the triode is triggered into conduction by the synch pulse applied to its control grid from differentiating circuit 34. The sweep capacitor rapidly discharges through the triode and is then ready to begin a new sweep cycle. In this way, the sawtooth wave is synchronized with the camera pulses so that the sawtooth sweep begins each time camera contact 11 closes.

The sawtooth voltage generated is supplied to a delay circuit 37 via a conventional cathode follower circuit 38, for example, of the type disclosed at pages 125–137 of "Electronics Manual For Radio Engineers" by Zeluff and Markus (first edition, 1949). Delay circuit 37 includes a capacitor 39 having one terminal connected to the output of cathode follower 38. The delay circuit further includes a first series circuit comprising potentiometer 40 and diode 41 and a second series circuit comprising potentiometer 42 and oppositely poled diode 43. The latter two series circuits are connected in parallel between the other terminal of capacitor 39 and ground.

If a positive sawtooth wave, as shown at the output of cathode follower 38, is applied to the delay circuit 37, the waveform of the output signal derived at lead 44 will also be a sawtooth wave, provided the RC time constants formed by capacitor 39 and potentiometers 40 and 42 are reasonably long relative to the sawtooth period. However, the output sawtooth waveform is now symmetrical with respect to ground potential because the capacitor 39 blocks the DC component of the sawtooth signal while passing the AC component. By varying potentiometers 40 and 42, the charging time constant and the discharge time constant of capacitor 39 are altered and the instant of time at which the sawtooth wave crosses the zero reference line can be varied. A variable shutter angle independent of the camera speed is thereby achieved. The charge circuit is via diode 41 and the discharge circuit is via diode 43. The symmetrical sawtooth wave is supplied to the input of trigger circuit 45. Trigger circuit 45 produces a sharp output pulse at the instant the input sawtooth wave crosses the zero reference line and then reverts back to its quiescent state when the sawtooth wave again crosses the zero reference line at the end of the sweep period.

By varying potentionmeters 40 and 42, the output pulse produced by trigger circuit 45 can be made to coincide with the closing of the camera shutter corresponding to the energization period of X-ray tube 2. The output pulse of trigger circuit 45 is supplied to the input of a one-shot monostable multivibrator 46 and triggers the multivibrator into its unstable state. Monostable multivibrator 46 is similar to input trigger 32 except that the circuit parameters of multivibrator 46 are chosen to produce a much shorter square wave pulse, for example, a 1 ms. pulse for multivibrator 46 in contrast to a 12 ms. pulse for input trigger 32.

The leading edge of the gate pulse produced by monostable multivibrator 46 corresponds to the instant at which the camera shutter closes. The gate pulse is supplied to diode gates 47 and 48 and "opens" these gates for 1 ms., thereby to sample the negative charge stored on integrated capacitor 30 during the previous "open" camera shutter interval. The gate pulse is simultaneously applied to diode gate 31 and "closes" this gate during the sampling interval to prevent loading of capacitor 30 by the photo-multiplier circuit and the stray capacitance of the connecting cables.

The integrated charge on capacitor 30 is supplied to an exposure meter 49 via a cathode follower circuit 50 and diode gate 48. The exposure meter provides a visual indication of the integrated image intensity. At the same time, the voltage on integrating capacitor 30 is applied to memory capacitor 51 via cathode follower 50, diode gate 47 and capacitor 52. Capacitor 52 forms a capactive voltage divider with memory capacitor 51. Memory capacitor 51 stores a charge proportional to the integrated image intensity during the interval between successive X-ray pulses. The stored charge on memory capacitor 51 thereby provides a control voltage for regulating both X-ray tube filament circuits during the interval in which integrating capacitor 30 is storing a new charge produced by photo-electric cell 21. Capacitor 52 discharges via resistor 53 during the interval between sampling pulses. Cathode follower 50 prevents undue loading of integrating capacitor 30 during the sampling interval.

The voltage stored on memory capacitor 51 serves to regulate the filament current for X-ray tubes 1 and 2 via amplifier 54 and output amplifiers 23 and 24, respectively. Output amplifiers 23 and 24 are identical and comprise cathode follower circuits 55 and 57, respectively, and power amplifiers 56 and 58, respectively. Output amplifiers 56 and 58 effectively act as a variable resistance element responsive to the control voltage stored on memory capacitor 51. A change in the voltage of capacitor 51 simultaneously produces a variation in the filament current of X-ray tubes 1 and 2.

FIG. 4 illustrates a preferred form of the stereo shutter synchronization circuit which is part of shutter control unit 25. Input terminal 60 receives a positive square wave pulse from pulse control unit 12 each time camera contact 10 closes. Capacitor 61 and resistors 62 and 63 form a differentiating circuit for the square wave pulse. A sharp positive voltage pulse is applied to the control grid of triode 64 from the common junction of resistor 62 and 63. A sweep capacitor 65 is connected between the anode of tube 64 and a point of negative DC potential on voltage divider 66. The anode of tube 64 is connected to the positive DC supply voltage via the series circuit comprising resistor 6 and diode 68. The cathode of triode 64 is connected to a terminal of capacitor 65 by means of cathode resistor 69. The anode of triode 64 is directly connected to the control grid of triode 70. The anode of tube 70 is directly connected to the positive DC supply and the cathode is connected to a point of negative potential on voltage divider 66 via resistor 71. A feedback capacitor 72 is connected between the cathode of tube 70 and the common junction point of resistor 67 and diode 68. Voltage divider 66 provides the proper DC operating voltages for the various tube electrodes.

Tubes 64 and 70 and their associated circuitry are connected to form a synchronized sawtooth voltage generator. Tube 64 functions as an electronic switch for periodically discharging sweep capacitor 65 in synchronism with the receipt of the pulse at terminal 60. Tube 70 functions as a cathode follower and supplies the sawtooth sweep voltage developed across sweep capacitor 65 to capacitor 87, one terminal of which is connected to the cathode of tube 70.

As mentioned above, sweep capacitor 65 is discharged in synchronism with the closure of contact 10 of the camera, i.e. at the instant the camera shutter "opens" for recording the image produced by X-ray tube 1. Upon termination of the sharp positive pulse at the control grid of tube 64, tube 64 reverts to the cut-off condition and capacitor 65 begins to charge towards the positive DC supply voltage via diode 68 and resistor 67 producing a linear increase in voltage at the control grid of tube 70. The cathode of tube 70 "follows" the voltage variation at the control grid and supplies a sawtooth voltage to capacitor 87. Feedback capacitor 72 feeds back a portion of this voltage and serves to increase the linearity of the sweep voltage produced by effectively acting as a constant current source for charging sweep capacitor 65.

The other terminal of capacitor 87 is connected to the common junction of resistors 73 and 74 and to the control grid of triode 75 via grid resistor 76. Resistors 73 and 74 are in turn connected to oppositely poled diodes 77 and 78, respectively. Diodes 77 and 78 are each in turn connected to an end terminal of potentiometer 79. The slider of potentiometer 79 is connected to a point of negative potential on voltage divider 66. Capacitor 87, resistors 73 and 74, diodes 77 and 78 and potentiometer 79 function in a manner similar to delay circuit 37 of the density stabilizer circuit described above to convert the positive going asymmetrical sawtooth wave to a substantially symmetrical sawtooth wave which varies about a zero reference voltage level. Potentiometer 79 provides a fine adjustment of the zero cross-over point of the symmetrical sweep voltage derived at the common junction of capacitor 87 and resistor 76. The symmetrical sweep voltage is applied to the control grid of tube 75 via resistor 76.

The anode of tube 75 is connected to the positive DC supply voltage by means of the series connection of resistors 80 and 81. A conventional bypass capacitor 82 is connected across resistor 81. The anode of tube 75 is also connected to one terminal of the voltage divider network comprising resistors 83 and 84. The other terminal of the voltage divider network is connected to the negative DC supply voltage. Zener diode 85 is connected between the common junction of resistors 83 and 84 and ground. The common junction of resistors 83 and 84 is also connected to an output terminal 86.

At the beginning of a sweep cycle, tube 75 is cut-off by the negative potential applied to its control grid from voltage divider 66. At the instant the sweep voltage crosses the zero reference level in the positive going direction, tube 75 is triggered into conduction. At the end of the sweep period, i.e. at the beginning of the next sweep cycle initiated by the trigger pulse at the control grid of tube 64, the sweep voltage again passes through the zero reference voltage level, but in the negative going direction. Tube 75 is then triggered into the cut-off state again and a new sweep cycle commences. A square wave pulse is produced at the anode of tube 75 and applied across voltage divider 83–84. Zener diode 85 clips the pulses and a sequence of fixed amplitude pulses synchronized with the camera shutter is supplied to synchronous motor 8 via output terminal 86 and amplifier 59. In this manner the movement of the stereo shutter 7 is maintained in synchronism with the camera shutter and the energizing pulses for X-ray tubes 1 and 2.

Although a preferred embodiment of the invention has been described with reference to a diagnostic type X-ray system, it will be obvious to those skilled in the art that the invention may find use in industrial type X-ray systems and that various changes and modifications may be made without departing from the true spirit and scope of this invention.

What is claimed is:
1. Stereoscopic X-ray apparatus for viewing a fluoroscopic image of an object and simultaneously recording said image by means of a motion picture camera comprising, first and second spaced apart sources of X-ray energy, a fluorescent screen arranged to receive alternate X-ray images of said object and convert same into light images, a shutter positioned between an observer and said fluorescent screen, a movie camera having a film transport mechanism, a shutter mechanism and first and second contacts alternately actuated in synchronism with said shutter mechanism, means for energizing said camera, first and second pulse generating circuits individually coupled to said first and second camera contacts for individually supplying energizing pulses to said first and second X-ray sources in synchronism with the operation of said first and second camera contacts, respectively, shutter control means coupled to the output of said first pulse generating circuit, means coupling the output of said shutter control means to said shutter to operate same in synchronism with said camera shutter mechanism and the energization of said X-ray sources, photoelectric means optically coupled to said fluorescent screen to produce a control signal proportional to the intensity of the light image on said screen, current control means coupled to the filament circuits of said first and second X-ray sources, means for coupling said control signal to one input of said current control means, and means for coupling a gating pulse from the output of said second pulse generating circuit to a second input of said current control means in synchronism with the operation of said second camera contact, said current control means being responsive thereto so as to adjust the filament current of said first and second X-ray sources to stabilize the intensity of the light image produced on said fluorescent screen.

References Cited

UNITED STATES PATENTS 2,331,225 10/1943 Powers _____ 250—60
2,972,681 2/1961 Lusby et al. _____ 250—60

FOREIGN PATENTS 149,376 8/1920 Great Britain.

WILLIAM F. LINDQUIST, *Primary Examiner.*

U.S. Cl. X.R.

250—65, 103